United States Patent
Schindlegger, Jr.

[19]

[11] Patent Number: 5,911,504
[45] Date of Patent: Jun. 15, 1999

[54] STIRRING DEVICE FOR A PERSONAL BEVERAGE CONTAINER

[76] Inventor: Walter Schindlegger, Jr., Dorf 211, A-3353 Seitenstetten, Austria

[21] Appl. No.: 08/913,945
[22] PCT Filed: Jan. 17, 1997
[86] PCT No.: PCT/EP97/00219
§ 371 Date: Dec. 29, 1997
§ 102(e) Date: Dec. 29, 1997
[87] PCT Pub. No.: WO97/25911
PCT Pub. Date: Jul. 24, 1997

[30] Foreign Application Priority Data

Jan. 18, 1996 [DE] Germany .......................... 296 00 833
Apr. 16, 1996 [DE] Germany .......................... 196 15 014

[51] Int. Cl.⁶ .................................................. A47J 43/27
[52] U.S. Cl. ........................ 366/197; 366/251; 366/314
[58] Field of Search ................................. 366/130, 197, 366/199, 205, 242–251, 314; 99/348; 241/282.1, 282.2

[56] References Cited

U.S. PATENT DOCUMENTS

| | | | |
|---|---|---|---|
| 1,103,949 | 7/1914 | Ecklyn | 366/314 |
| 2,513,035 | 6/1950 | Lopata | 366/314 X |
| 2,920,875 | 1/1960 | Marfuggi | 366/197 |
| 3,504,816 | 4/1970 | Weichsel. | |
| 3,704,864 | 12/1972 | Lee | 366/205 |
| 3,881,705 | 5/1975 | Greenspan | 366/205 X |
| 4,264,216 | 4/1981 | Stansbury, Jr. . | |
| 5,052,593 | 10/1991 | Grome et al. . | |
| 5,425,579 | 6/1995 | Sampson . | |
| 5,720,552 | 2/1998 | Schindlegger . | |

FOREIGN PATENT DOCUMENTS

| | | |
|---|---|---|
| 359 839 | 4/1980 | Austria . |
| 562310 | 9/1993 | European Pat. Off. ............... 366/314 |
| 1 928 641 | 10/1965 | Germany . |
| 1 251 478 | 10/1967 | Germany . |
| 21 10 047 | 9/1972 | Germany . |
| 30 04 378 | 8/1981 | Germany . |
| 34 33 693 | 3/1986 | Germany . |
| 87 05 605 | 8/1987 | Germany . |
| 38 36 216 | 4/1990 | Germany . |
| 94 12 137 | 3/1995 | Germany . |
| 43 43 212 | 6/1995 | Germany . |
| 269 00 833 | 5/1996 | Germany . |
| 2134804 | 8/1984 | United Kingdom . |
| 95/16380 | 6/1995 | WIPO .................................. 366/205 |

OTHER PUBLICATIONS

TORNADO™ Personal Mixer, instruction sheet and photographs (4), Dec., 1995.

Primary Examiner—Charles E. Cooley
Attorney, Agent, or Firm—Flynn, Thiel, Boutell & Tanis, P.C.

[57] ABSTRACT

A stirring device for a container, such as a baby bottle, said stirring device exhibiting a recess which closes off the container opening when the container is inverted. The recess is fitted with an inner wall section with an inside thread for screwing in the container. A drive shaft of a stirrer extends through the bottom of the recess. The housing consists of an outer wall section, the inner wall section with the bottom and a ring section which connects the outer wall section with the inner wall section. The housing is closed off with a bottom plate. The batteries that supply electrical power to the stirrer motor are placed vertically between the outer wall section and the inner wall section.

20 Claims, 1 Drawing Sheet

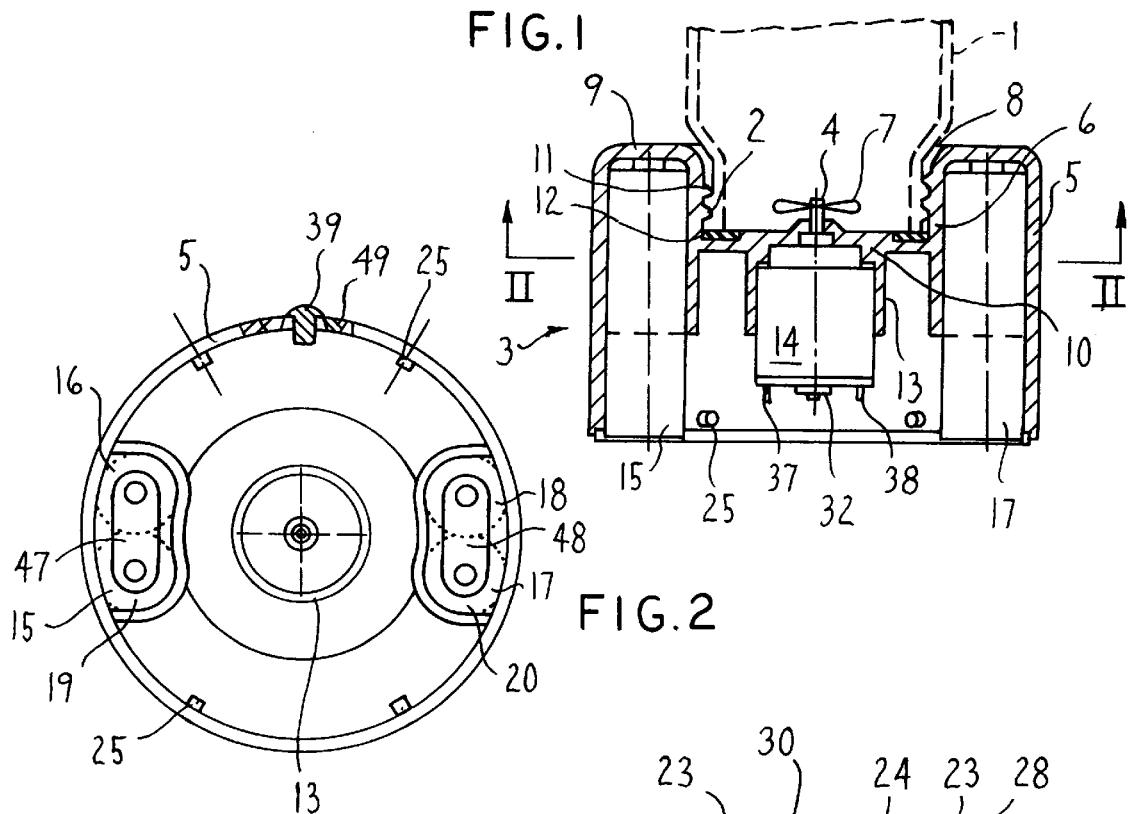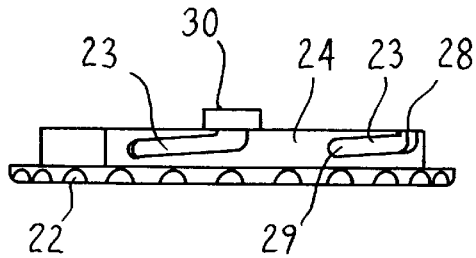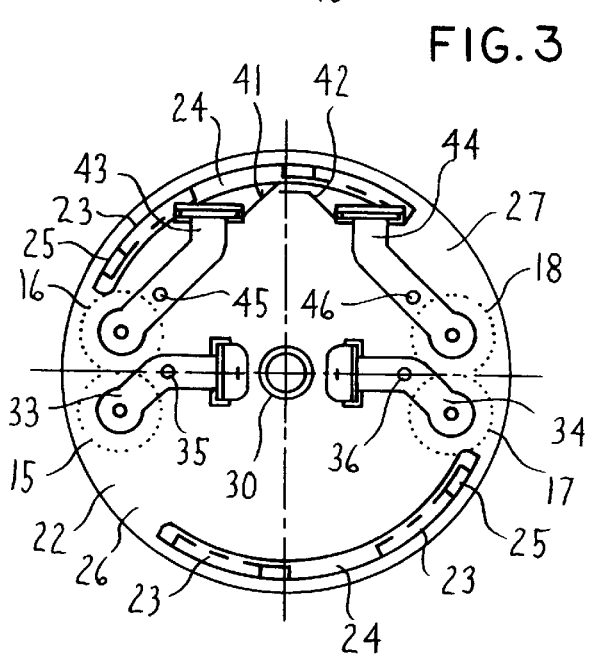

STIRRING DEVICE FOR A PERSONAL BEVERAGE CONTAINER

FIELD OF THE INVENTION

This invention relates to a stirring device for a container with an opening at the upper end which has a housing with a concentric depression about the stirrer shaft which seals the downward pointing container opening when the container is turned upside down,

BACKGROUND OF THE INVENTION

A container with an integrated stirrer is employed as a feeding bottle for infants. To prepare food for the infant one puts dried milk and water into the feeding bottle and shakes the bottle after sealing until a uniform consistency is reached. This is time-consuming and tiring. DE-GM 87 05 605 therefore proposes a stirring device with a stirrer shaft to be filled from above and protruding through the bottle cap. The disadvantage of the known stirring device is that the cap with the relatively long stirrer shaft and stirring tool must be screwed onto the bottle and the stirrer shaft then connected to the motor with a coupling and the motor held during stirring, i.e. the relatively difficult handling of this stirring device.

Further, so-called kitchen mixers are known wherein the food ingredients are put into a shaker to be sealed with a cover. The lower end of the shaker can be screwed onto the stirring device in order to separate the shaker for cleaning the stirring device. These kitchen mixers are thus only suitable for special shakers which have an opening above and below but are sealed below by the bottom integrally formed with the bottle, jar or container.

For stirring additives into liquid media, for example protein granules or protein powder into milk or juices or ready-cooked baby food, or for spicing mayonnaises or sauces, producing cream or fruity milkshakes or adjusting the consistency of paints, one must hitherto remove the content from the original vessel and put it into another vessel where it is mixed by hand or an electrically operated stirring device after the additives are added. This always means that some of the material is necessarily lost, being left in the original vessel. Also, an additional stirring device must be used and cleaned.

The older German utility model application 296 00 833.8 discloses a stirring device for quickly mixing the material to be stirred in bottles, jars and similar containers without it having to be decanted.

The object of the invention is to improve the structure of the stirring device known from this utility model application.

SUMMARY OF THE INVENTION

The subject and purposes of the invention are met by a stirring device for a container with an opening, the stirring device including a housing shaped to have a circumferentially extending outer wall and a circumferentially extending inner wall located inwardly of the outer wall. The inner wall defines a circular depression for receiving the container opening. A ring connects the outer wall and the inner wall. A bottom panel extends inwardly from the inner wall to define a base for the depression. The inner wall has threads for engaging the container to secure the container having an open bottom end in the depression. A seal seated in the depression seals the container in the depression. A stirring motor is secured in the housing below the bottom panel. A stirring tool with a stirring shaft connects the stirring tool to the stirring motor. The stirring shaft extends through the bottom panel into the depression and the stirring tool is located above the bottom panel. A plurality of batteries energize the stirring motor. The batteries generally are vertically oriented in the housing between the outer wall and the inner wall. A baseplate seals the open bottom end of the housing.

BRIEF DESCRIPTION OF THE DRAWINGS

In the following description, an embodiment of the inventive stirring device will be explained more closely by way of example with reference to the drawing, in which:

FIG. 1 shows a section through the stirring device (without the baseplate);

FIG. 2 shows a section along line II—II in FIG. 1;

FIG. 3 shows a side view of the baseplate; and

FIG. 4 shows a plan view of the baseplate according to FIG. 1.

DETAILED DESCRIPTION

A stirring device for a container, namely for a feeding bottle 1 for infants shown by dashed lines in FIG. 1 with outside screw thread 2, has housing 3 comprising cylindrical outside wall portion 5 concentric with stirrer shaft 4, cylindrical inside wall portion 6 concentric with stirrer shaft 4 in depression 8 of the housing, ring portion 9 connecting outside wall portion 5 with inside wall portion 6, and a bottom 10 in depression 8. In depression 8 inside wall portion 6 is provided with inside screw thread 11 into which standardized outside screw thread 2 of feeding bottle 1 can be screwed. For sealing the opening of feeding bottle 1 screwed into inside screw thread 11, annular seal 12 is provided in the bottom 10 of depression 8 on the side facing inside screw thread 11. Stirrer shaft 4 is provided with stirring blade 7.

At bottom 10 of depression 8 cylindrical extension 13 concentric with stirrer shaft 4 is provided on the side facing away from inside screw thread 11 for receiving stirrer motor 14 which has a cylindrical housing. To supply power to stirrer motor 14 four 1.5 volt batteries 15 to 18 are provided which are disposed in pairs in two diametrically opposite battery compartments provided between outside wall portion 5 and inside wall portion 6 of housing 3. Batteries 15 to 18 are disposed vertically in battery compartments 19, 20, i.e. their longitudinal axis extends parallel to stirrer shaft 4.

Housing 1 is sealed with baseplate 22 with a bayonet catch on the side facing away from depression 8 (FIGS. 3 and 4).

The bayonet catch is formed by recesses 23 on the outer side of cylindrical wall portion 24 concentric with stirrer shaft 4 on the circumference of baseplate 22 on the side facing housing 1, and by peg-shaped projections 25 disposed on the inner side of inside wall portion 6 of housing 1. Wall portion 24 defines two gaps 26 and 27 provided in the area of battery compartments 19, 20 when baseplate 22 is fastened to housing 1. Altogether four recesses 23 are provided for the bayonet catch. As evident from recesses 23 shown by dashed lines in FIG. 4, the four recesses 23 are disposed in pairs on opposite sides of baseplate 22. Recesses 23 consist in each case of entry portion 28 axis-parallel to stirrer shaft 4 on the upper edge of wall portion 24 facing away from baseplate 22, and end portion 29 extending from entry portion 28 obliquely downward to baseplate 22. The four peg-shaped projections 25 on inside wall portion 6 are disposed at the same angle to each other as entry portions 28 of the four recesses 23 in wall portion 24.

When peg-shaped projections 25 on housing 1 are inserted into entry portions 28 of recesses 23 on baseplate 22 and baseplate 22 rotated relative to housing 1, projections 25 are rotated into end portions 29 of recesses 23 and baseplate 22 thus held reliably on housing 1.

Baseplate 22 has in the middle in sleeve-shaped extension 30 a centering recess which motor 14 engages with axial projection 32 when baseplate 22 is fastened to housing 3.

Two conductors 33, 34 formed as metal strips are fastened to baseplate 22 with pins 35, 36 on the side facing housing 3. Each conductor 33, 34 extends with one end obliquely upward to one of the terminals 37 or 38 of motor 14. The other end of conductor 33, 34 extending on baseplate 22 extends to the corresponding pole of the two batteries 15, 17 on the side facing baseplate 22.

According to FIG. 2, push button 39 of a switch for operating stirrer motor 14 is provided in outside wall portion 5. The switch has two contact pieces 41, 42 disposed on the inner side of the outside wall portion which are closed by push button 39. Contact pieces 41, 42 are connected to one, upper end of two conductors 43, 44 in the form of metal strips. Conductors 43, 44 are fastened with pins 45, 46 to baseplate 22. The other end of conductors 43, 44 extends on baseplate 22 to the poles of the two batteries 16, 18. The poles facing away from baseplate 22 of the two batteries 15, 16 and 17 and 18 in the two battery compartments 19, 20 are interconnected in each case by conductor 47, 48 in the form of a metal strip disposed on the inner side of ring portion 9 of housing 3 (FIG. 2). Push button 39 consists of a part made of rubber-elastic plastic with conic holding portion 49 in a corresponding conic opening in wall 5.

To prepare the content of baby bottle 1 according to FIG. 1, one proceeds by placing baby bottle 1 filled e.g. with dried milk, water and optionally further ingredients on a table for example, normally, i.e. with the opening facing upward. One then screws, rather than the screw cap of baby bottle 1, housing 3, i.e. the stirring device, with depression 8 facing downward onto baby bottle 1 from above. Then one rotates bottle 1 with screwed-on stirring device or housing 3 by 180° so that housing 3 tightly seals the downward pointing opening of bottle 1. One then switches on stirring motor 14 by operating push button 39 stirring tool 7 stirs the content of bottle 1 until the desired consistency is reached. During stirring one can place bottle 1 with housing 3 fastened thereto with baseplate 22 on a table for example. One can proceed in the same way to stir the content of a jar of baby food.

I claim:

1. A stirring device for a container with an opening, said stirring device including:

a housing shaped to have: a circumferentially extending outer wall; a circumferentially extending inner wall located inwardly of said outer wall, said inner wall defining a circular depression for receiving the container opening; a ring connecting said outer wall and said inner wall; a bottom panel extending inwardly from said inner wall to define a base for the depression; threading around said inner wall for engaging the container to secure the container in the depression; and an open bottom end;

a seal seated in the depression for sealing the container in the depression;

a stirring motor secured in said housing below said bottom panel;

a stirring tool with a stirring shaft connected to said stirring tool, wherein said stirring shaft is connected to said stirring motor, said stirring shaft extends through said bottom panel into the depression and said stirring tool is located above said bottom panel;

a plurality of batteries for energizing said stirring motor, said batteries being vertically oriented in said housing between said outer wall and said inner wall; and a baseplate for sealing the open bottom end of said housing, said baseplate being removably securable to said housing.

2. The stirring device of claim 1, wherein said bottom panel is formed with an extension that is directed toward the open bottom end of said housing and said stirring motor is disposed in said extension.

3. The stirring device of claim 1, wherein said batteries are provided with terminals at opposed ends of said batteries and a conductor mounted to an inner surface of said housing ring electrically connects the terminals of two said batteries together.

4. The stirring device of claim 1, wherein said housing is formed with projections that extend inwardly from an inner surface of said outer wall adjacent the open bottom end of said housing and said baseplate is formed to define recesses for receiving said projections so that said projections seat in said recesses to secure said baseplate to said housing.

5. A stirring device for a container with an opening, said stirring device including:

a housing shaped to have: a circumferentially extending outer wall; a circumferentially extending inner wall located inwardly of said outer wall, said inner wall defining a circular depression for receiving the container opening; a ring connecting said outer wall and said inner wall; a bottom panel extending inwardly from said inner wall to define a base for the depression; threading around said inner wall for engaging the container to secure the container in the depression; an open bottom end; and a plurality of projections that extend inwardly from an inner surface of said outer wall adjacent the open end;

a seal seated in the depression for sealing the container in the depression;

a stirring motor secured in said housing below said bottom panel;

a stirring tool with a stirring shaft connected to said stirring tool, wherein said stirring shaft is connected to said stirring motor, said stirring shaft extends through said bottom panel into the depression and said stirring tool is located above said bottom panel;

a plurality of batteries for energizing said stirring motor; said batteries being disposed in said housing; and a baseplate for sealing the open bottom end of said housing, said baseplate having a wall portion that extends into said housing, wherein said wall portion is formed with a plurality of recesses for receiving said projections of said housing so that said projections and said wall portion recesses form bayonet catches for releasably securing said baseplate to said housing.

6. The stirring device of claim 5, wherein said wall portion of said baseplate is shaped to define a plurality of gaps, and said batteries are seated in said housing so that when said baseplate is secured to said housing, said batteries extend into said gaps.

7. The stirring device of claim 5, wherein said batteries are vertically oriented in said housing.

8. A stirring device for a container with an opening, said stirring device including:

a housing shaped to have: a circumferentially extending outer wall; a circumferentially extending inner wall located inwardly of said outer wall, said inner wall defining a circular depression for receiving the container opening; a ring connecting said outer wall and said inner wall; a bottom panel extending inwardly from said inner wall to define a base for the depression; threading around said inner wall for engaging the container to secure the container in the depression; and an open bottom end;

a seal seated in the depression for sealing the container in the depression;

a stirring motor secured in said housing below said bottom panel, said stirring motor having an axially extending projection directed towards the open bottom end of said housing;

a stirring tool with a stirring shaft connected to said stirring tool, wherein said stirring shaft is connected to said stirring motor, said stirring shaft extends through said bottom panel into the depression and said stirring tool is located above said bottom panel;

a plurality of batteries for energizing said stirring motor, said batteries being disposed in said housing; and a baseplate for sealing the open bottom end of said housing, said baseplate being provided with a centering boss that extends into said housing and that is positioned to engage over said projection of said stirring motor to center said baseplate over the open bottom end of said housing.

9. The stirring device of claim 8, further including a plurality of conductive members secured to an inner surface of said baseplate, each said conductive member being positioned to establish a conductive path between one of said batteries and a terminal integral with said stirring motor.

10. A stirring device for a container with an opening, said stirring device including:

a housing shaped to have: a circumferentially extending outer wall; a circumferentially extending inner wall located inwardly of said outer wall, said inner wall defining a circular depression for receiving the container opening; a ring connecting said outer wall and said inner wall; a bottom panel extending inwardly from said inner wall to define a base for the depression; threading around said inner wall for engaging the container to secure the container in the depression; and an open bottom end;

a seal seated in the depression for sealing the container in the depression;

a stirring motor secured in said housing below said bottom panel, said stirring motor having opposed terminals to which an energization voltage for said stirring motor is applied;

a stirring tool with a stirring shaft connected to said stirring tool, wherein said stirring shaft is connected to said stirring motor, said stirring shaft extends through said bottom panel into the depression and said stirring tool is located above said bottom panel;

a plurality of batteries for energizing said stirring motor, said batteries having terminals;

a baseplate for sealing the open bottom end of said housing, said baseplate having an inner surface that is directed towards the open bottom end of said housing; and two conductive members mounted to said inner surface of said baseplate, each said conductive member having a first end positioned to contact the terminal of one of said batteries and a second end positioned to contact one of said terminals of said stirring motor, wherein each said conductive member establishes an electrical connection from a separate one of said batteries to a separate one of said terminals of said stirring motor.

11. The stirring device of claim 10, wherein said batteries are vertically oriented in said housing.

12. The stirring device of claim 10, wherein said batteries are vertically oriented in said housing and are positioned to be located between said outer and said inner walls of said housing.

13. The stirring device of claim 10, wherein said housing is formed with projections that extend inwardly from an inner surface of said outer wall adjacent the open bottom end and said baseplate is formed to define recesses for receiving said projections so that said projections seat in said recesses to secure said baseplate to said housing.

14. A stirring device for a container with an opening, said stirring device including:

a housing shaped to have: a circumferentially extending outer wall; a circumferentially extending inner wall located inwardly of said outer wall, said inner wall defining a circular depression for receiving the container opening; a ring connecting said outer wall and said inner wall; a bottom panel extending inwardly from said inner wall to define a base for the depression; threading around said inner wall for engaging the container to secure the container in the depression; and an open bottom end;

a seal seated in the depression for sealing the container in the depression;

a stirring motor secured in said housing below said bottom panel, said stirring motor having opposed terminals to which an energization voltage for said stirring motor is applied;

a stirring tool with a stirring shaft connected to said stirring tool, wherein said stirring shaft is connected to said stirring motor, said stirring shaft extends through said bottom panel into the depression and said stirring tool is located above said bottom panel;

a plurality of batteries for energizing said stirring motor, said batteries having terminals;

a baseplate for sealing the open bottom end of said housing, said baseplate having an inner surface that is directed towards the open bottom end of said housing;

two first conductive members mounted to said inner surface of said baseplate, each said conductive member having opposed first and second ends wherein said first ends of said first conductive members are positioned to contact the terminals of separate ones of said batteries; and a switch assembly for regulating the application of the energization voltage from said batteries to said motor, said switch assembly including a pair of adjacent conductive contact members mounted to an inner surface of said outer wall of said housing, each said contact member being connected to the second end of a separate one of said first conductive members and a push button mounted to said outside wall, said push button being positioned to, upon actuation, establish a connection between said contact members so as to cause the energization voltage to be applied to said stirring motor.

15. The stirring device of claim 14, wherein said batteries are vertically oriented and positioned to be located in said housing between said outer and said inner walls and at least two said batteries are electrically connected together by a conductive member mounted to an inner surface of said ring of said housing.

16. The stirring device of claim 15, wherein: said stirring motor has two opposed terminals to which the energization voltage is applied; and two second conductive members are provided on an inner surface of said baseplate, each said second conductive member establishing an electrical connection between a separate one of said batteries and a separate one of said terminals of said stirring motor.

17. The stirring device of claim 14, wherein: said stirring motor has two opposed terminals to which the energization voltage is applied; and two second conductive members are provided on an inner surface of said baseplate, each said second conductive member establishing an electrical connection between a separate one of said batteries and a separate one of said terminals of said stirring motor.

18. The stirring device of claim 14, wherein said bottom panel is formed with an extension that is directed toward the open bottom end of said housing and said stirring motor is disposed in said extension.

19. The stirring device of claim 14, wherein said batteries are vertically oriented in said housing.

20. The stirring device of claim 14, wherein said baseplate is formed with an extension that is directed to said stirring motor and said stirring motor seats in said extension to center said baseplate over the open end of said housing.

* * * * *